US012654480B2

(12) United States Patent
Tsai

(10) Patent No.: US 12,654,480 B2
(45) Date of Patent: Jun. 16, 2026

(54) REFLECTIVE THERMAL TRANSFER PRINTING LABEL MANUFACTURING METHOD, SINGLE-COLOR REFLECTIVE LABEL AND MULTI-COLORS REFLECTIVE LABEL

(71) Applicants: DONGGUAN YUEMEI LABEL AND PRINTING CO., LTD., Dongguan City (CN); HP SILICONE LABEL LTD., New Taipei City (TW)

(72) Inventor: Kuolih Tsai, Dongguan City (CN)

(73) Assignees: DONGGUAN YUEMEI LABEL AND PRINTING CO., LTD., Dongguan City (CN); HP SILICONE LABEL LTD, New Taipei City (TW)

( * ) Notice: Subject to any disclaimer, the term of this patent is extended or adjusted under 35 U.S.C. 154(b) by 183 days.

(21) Appl. No.: 18/294,428

(22) PCT Filed: Aug. 10, 2021

(86) PCT No.: PCT/CN2021/111695
§ 371 (c)(1),
(2) Date: Feb. 1, 2024

(87) PCT Pub. No.: WO2023/015432
PCT Pub. Date: Feb. 16, 2023

(65) Prior Publication Data
US 2024/0336079 A1     Oct. 10, 2024

(51) Int. Cl.
B41M 5/382 (2006.01)
B41M 3/00 (2006.01)
(Continued)

(52) U.S. Cl.
CPC ........ B41M 5/38228 (2013.01); B41M 3/008 (2013.01); B41M 7/0009 (2013.01);
(Continued)

(58) Field of Classification Search
CPC .. B41M 5/38228; B41M 5/382; B41M 3/008; B41M 3/00; B41M 7/0009; B41M 7/00;
(Continued)

(56) References Cited

U.S. PATENT DOCUMENTS

| | | | | |
|---|---|---|---|---|
| 2007/0081254 A1* | 4/2007 | Endle | ........... | G02B 3/0056 359/619 |
| 2010/0103527 A1* | 4/2010 | Endle | ........... | B42D 25/324 359/620 |

FOREIGN PATENT DOCUMENTS

| | | |
|---|---|---|
| CN | 201622360 U | 11/2010 |
| CN | 204991001 U | 1/2016 |

(Continued)

*Primary Examiner* — Justin V Lewis
(74) *Attorney, Agent, or Firm* — MUNCY, GEISSLER, OLDS & LOWE, P.C.

(57) ABSTRACT

A reflective thermal transfer label manufacturing method includes the step S1: providing a reflective layer with a plurality of beads; step S2: forming a first mask on the reflective layer, and is pre-formed with a first hollow pattern; step S3: printing a first ink on the first mask; step S4: adding the glue layer into a first ink; step S5: peeling off the first ink and the glue layer, so the plurality of beads of the reflective layer is separated from the reflective layer in the area of the first hollow pattern; and step S6: forming a reflective label with the first hollow pattern, the reflective label is composed of the plurality of beads, the first ink and the glue layer. The present invention also provides a single-color reflective label and a multi-colors reflective label.

13 Claims, 8 Drawing Sheets

(51) Int. Cl.

| | | |
|---|---|---|
| *B41M 7/00* | (2006.01) |
| *G02B 5/08* | (2006.01) |
| *G09F 3/02* | (2006.01) |
| *G09F 3/10* | (2006.01) |

(52) U.S. Cl.
CPC ............. *G02B 5/0808* (2013.01); *G09F 3/02* (2013.01); *G09F 3/10* (2013.01); *G09F 2003/0202* (2013.01); *G09F 2003/025* (2013.01); *G09F 2003/0257* (2013.01)

(58) Field of Classification Search
CPC G02B 5/0808; G02B 5/08; G09F 3/02; G09F 3/10; G09F 2003/0202; G09F 2003/025; G09F 2003/0257
USPC ...... 283/67, 70, 72, 80, 81, 91, 94, 98, 101, 283/109, 114
See application file for complete search history.

(56) References Cited

FOREIGN PATENT DOCUMENTS

| | | |
|---|---|---|
| CN | 206456041 U | 9/2017 |
| CN | 107749236 A | 3/2018 |
| CN | 213545735 U | 6/2021 |
| TW | 200635769 A | 10/2006 |
| TW | 200639760 A | 11/2006 |

\* cited by examiner providing a reflective layer with a plurality of beads ⸺ S11 forming a first mask on the reflective surface of the reflective layer ⸺ S12 printing a firs ink on the first mask ⸺ S13 adding a glue layer into the first mask ⸺ S14 peeling off the first ink and the glue layer ⸺ S15 forming a reflective label ⸺ S16

30

REFLECTIVE THERMAL TRANSFER PRINTING LABEL MANUFACTURING METHOD, SINGLE-COLOR REFLECTIVE LABEL AND MULTI-COLORS REFLECTIVE LABEL

CROSS-REFERENCE TO RELATED APPLICATIONS

This application claims the benefit of PCT/CN 2021/111695, filed Aug. 10, 2021, which is incorporated in its entirety by reference herein.

FIELD OF THE INVENTION

The present invention relates to a reflective thermal transfer label manufacturing method, particularly relates to a reflective thermal transfer printing manufacturing method and the printing method thereof.

BACKGROUND OF THE INVENTION

In addition to allowing consumers or buyers to identify trademarks, manufacturers, origins, products and other information, traditional high-reflective label can also achieve publicity and other effects through the high-reflective label.

How to make a product that can be fixed on a carrier (such as clothes, hats, shoes) for a long time while maintaining high reflectivity, water resistance, and so on, is an important issue.

In addition, the traditional high-reflective label manufacturing method can only design all reflective labels for a single color, but the multi-color labels cannot be manufactured.

In addition, the traditional high-reflective labels are cut through laser cutting and other methods, so the edges of the pattern of the labels are often unclear and burrs may appear.

Accordingly, the present invention provides a reflective thermal transfer label manufacturing method, a single-color reflective label and a multi-colors reflective label to solve the traditional problems.

SUMMARY OF THE INVENTION

It is a first object of the present invention is to provide a reflective thermal transfer label manufacturing method which uses a mask to manufacture high-reflective and clear-contour reflective label.

It is a second object of the present invention is to manufacture a single-color and multi-colors reflective label through a plurality of masks according to the aforementioned reflective thermal transfer label manufacturing method.

It is a third object of the present invention is that according to the aforementioned reflective thermal transfer label manufacturing method, the material of ink includes for example, plastisol, solvent, water based, silicon or adhesive, so the reflective label includes the characteristics such as friction resistance, miniaturization, high resolution, and water resistance.

It is a fourth object of the present invention is to adhere to the carrier, for example, the thermal transfer technology according to the aforementioned reflective thermal transfer label manufacturing method and to be able to adhere to the carrier for a long time.

It is a fifth object of the present invention is to provide a single-color reflective label with high reflection.

It is a sixth object of the present invention is to provide a multi-colors reflective label with high reflection.

In order to achieve the above objects and other objects, the present invention provides a reflective thermal transfer label manufacturing method, includes step S1: providing a reflective layer with a plurality of beads, wherein each of the plurality of beads includes a display surface and a reflective surface, and the plurality beads is arranged on the reflective layer, such that the reflective surface of the plurality of beads faces a same side, and the plurality of beads is partially reflective and optically transparent, and the reflective surface is selectively coated with a metal material; step S2: forming a first mask on the reflective surface of the reflective layer, in which the first mask is pre-formed with a first hollow pattern; step S3: printing a first ink on the first mask, wherein the first ink is printed on the reflective surface of the reflective layer through the first hollow pattern, and the first ink has a first color; step S4: adding a glue layer into the first glue layer; step S5: peeling off the first ink and the glue layer from the reflective layer, wherein the plurality of beads of the reflective layer is separated from the reflective layer in the area of the first hollow pattern; and step S6: forming a reflective label, wherein the reflective label is composed of the plurality of beads, the first ink and the glue layer and the reflective label has a first hollow pattern.

In order to achieve above objects and other objects, the present invention provides a single-color reflective label, which includes a first ink layer and a glue layer. The reflective layer includes a plurality of beads, wherein the plurality of beads includes a display surface and a reflective surface, and the plurality of beads is arranged on the reflective layer, such that the reflective surface of the plurality of beads faces a same side, and the plurality of beads is partially reflective and optically transparent, and the reflective surface is selectively coated with a metal material. One side of the first ink layer is arranged on the reflective layer. The first ink layer is printed on a first release element with the first hollow pattern, in which the first hollow pattern only includes the plurality of beads and is formed on one side of the reflective surface. The first ink layer has a first color. The glue layer is stacked on another side of the first ink layer and is fused to the first ink layer, in which when an external white light is incident on the display surface, the white light is reflected by the reflective surface to form a first emitted light of the first hollow pattern; and when the reflective surface is partially reflective and optically transparent, the wavelength of the first emitted light is determined by a first color, and when the reflective surface is coated with the metal material, the first wavelength of the first emitted light is determined by a characteristic of the metal material.

In order to achieve above objects and other objects, the present invention provides a multi-colors reflective label, which includes a reflective layer, a first ink layer, a second ink layer and a glue layer. The reflective layer includes a plurality of beads. The plurality of beads includes a display surface and a reflective surface, in which the plurality of beads is arranged on the reflective layer, such that the reflective surface of the plurality of beads faces a same side and the plurality of beads is partially reflective and optically transparent, and the reflective surface is selectively coated with a metal material. One side of the first ink layer is arranged on the reflective layer. The first ink is printed on a first release element with a first hollow pattern to form a first hollow pattern, in which the first hollow pattern only includes the plurality of beads and is formed on one side of the reflective surface. The first ink layer includes a first color. One side of the second ink layer is arranged on the first ink layer. The second ink layer is printed on a second release element with a second hollow pattern to form a second hollow pattern without the plurality of beads, in which the second ink layer includes a second color, the glue layer is stacked on another side of the first ink layer, in which when an external white light is incident on the display surface, the white light is reflected by the reflective surface to form a first emitted light of the first hollow pattern and the white light is reflected by the second ink layer to form a second emitted light of the second hollow pattern; and when the reflective surface is partially reflective and optically transparent, the wavelength of the first emitted light is determined by the first color, and when the reflective surface is coated with the metal material, the wavelength of the first emitted light is determined by a characteristic of the metal material, and the wavelength of the second emitted light is determined by the second color.

Compare with traditional reflective label, the reflective thermal transfer label manufacturing method, single-color reflective label, and multi-colors reflective label provided by the present invention includes at least the following characteristics:

(i) clear contour: by using mask (or release) and the printing technology, the patterns and text with clear contour in single color and multi-colors can be achieved.

(ii) washing resistance: the reflective label of the present invention is suitable for inks made of plastisol, solvent, water-based, silicon or adhesive material, which can achieve the advantages of wear resistance and cleaning resistance.

(iii) single-color or multi-colors (or color) high-reflective label: the present invention provides highly-reflective single-color label and partially or fully highly-reflective multi-colors label.

(iv) block printing: in addition to full-page printing, the block mask can also be set for specific pattern region without fully-page printing.

The specific technology used in the present invention will be further explained through the following examples and attached drawings.

DETAILED DESCRIPTION OF THE PREFERRED EMBODIMENT

In order to fully understand the purpose, characteristics and effects of the present invention, the present invention is described in detail through the following specific embodiments in conjunction with the attached drawings, as follows.

In the present invention, "a" or "an" is used to describe the units, elements and components described herein. This is done only for convenience of explanation and to provide a general sense of the scope of the invention. Therefore, unless it is obvious otherwise, such description should be understood to include one, at least one, and the singular also includes the plural.

In this present invention, the terms "include", "includes", "has", "contains", or any other similar terms are intended to cover a non-exclusive inclusion. For example, an element, structure, article, or device that contains multiple elements is not limited to those listed herein but may include elements that are not expressly listed but are generally inherent to the element, structure, article, or device, other requirements. Otherwise, unless expressly stated to the contrary, the term "or" means an inclusive "or" and not an exclusive "or".

Figure 1:
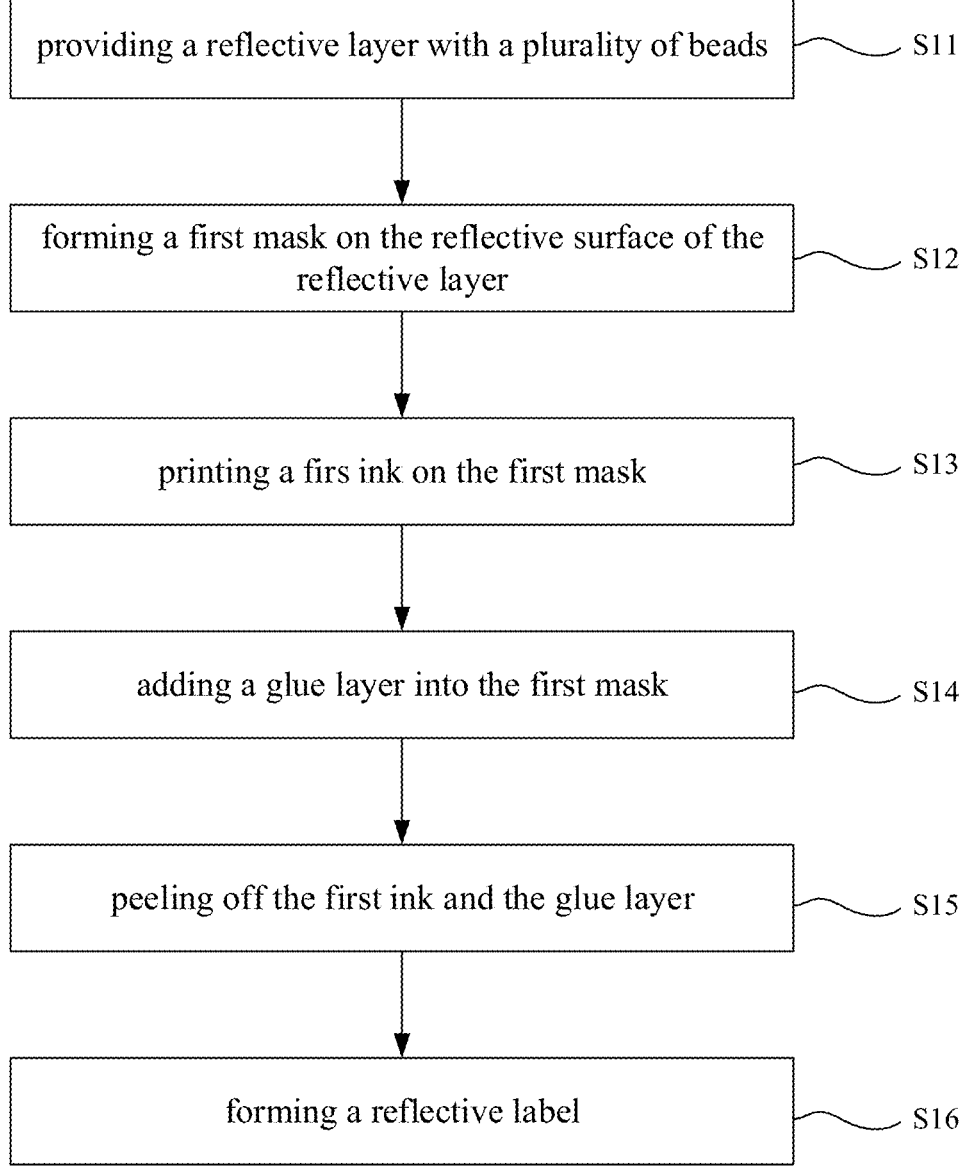
FIG. 1 is a flow chart of a reflective thermal transfer label manufacturing method according to the first embodiment of the present invention.

Referring to FIG. 1, it is a flow chart of a reflective thermal transfer label manufacturing method according to the first embodiment of the present invention. In FIG. 1, the reflective thermal transfer label manufacturing method is applied to single-color reflective thermal transfer label.

Figure 2A:
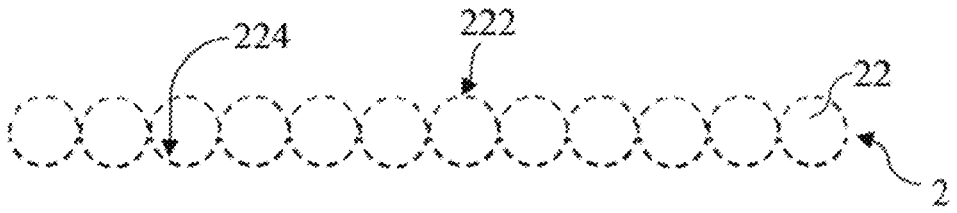
FIG. 2a and FIG. 2b are cross-sectional views illustrating the reflective layer of FIG. 1.
Figure 2B:
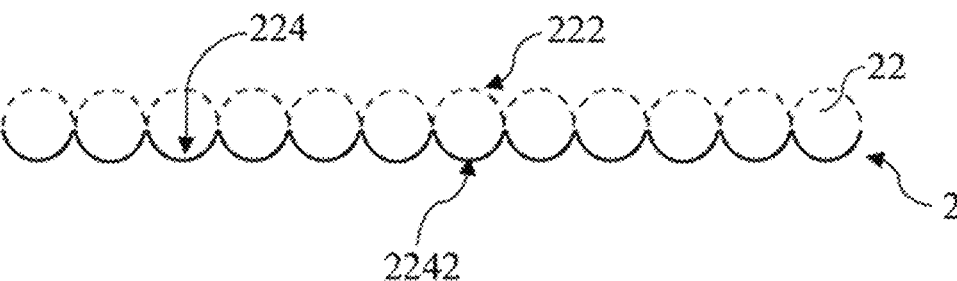

The reflective thermal transfer label manufacturing method begins from step S11, providing a reflective layer with a plurality of beads. FIG. 2a and FIG. 2b are referred together, which are cross-sectional views illustrating the reflective layer of FIG. 1. In FIG. 2a, the reflective layer 2 includes a plurality of beads 22. Each the plurality of bead 22 has a display surface 222 and a reflective surface 224. For example, the bead 22 is a glass sphere. The plurality of beads 22 is arranged on the reflective layer 2, such that the reflective surface 224 of the plurality of beads 22 faces the same side, and the plurality of beads 22 is partially reflective and optically transparent. In another embodiment, referring also to FIG. 2b, the reflective surface 224 is coated with a metal material 2242, the metal material 2242 such as aluminum material, which can improve higher reflectivity. In one embodiment, the first ink is plastisol, solvent, water-based, silicon or adhesive, and the metal material 2242 is aluminum.

Figure 3A:
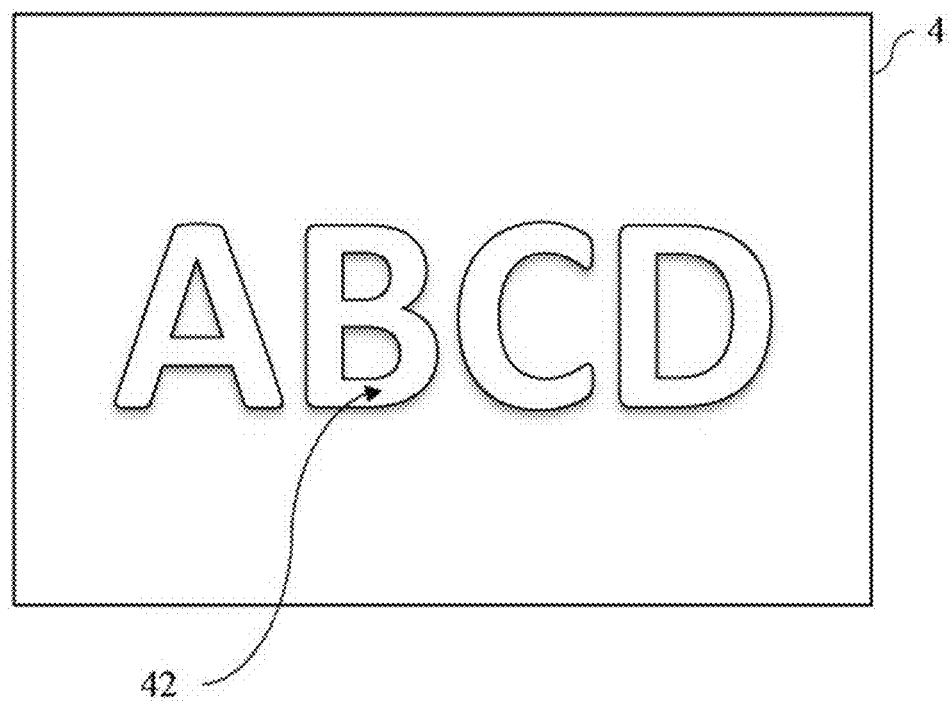
FIG. 3a is a top view illustrating a first mask of FIG. 1 of the present invention.
Figure 3B:
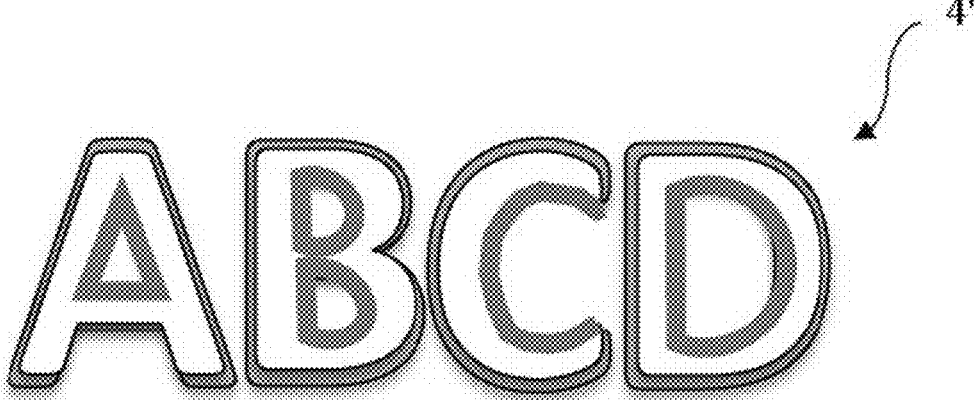
FIG. 3b is a top view of the first mask illustrating another embodiment of FIG. 1 of the present invention.

Returning to FIG. 1, in step S12: forming a first mask on the reflective surface of the reflective layer. FIG. 3a is also referred together herein, which is a top view illustrating a first mask of FIG. 1 of the present invention. In FIG. 3a, a first mask 4 is pre-formed with a first hollow pattern 42. In this embodiment, the text "ABCD" is used as an example. The text "ABCD" is a hollow shape. It is worth noting that the first mask 4 is formed in a way of full-size, that is, the entire first mask 4 is the first mask; in another embodiment, the first mask 4 can also be a partial region. For example, the first mask 4' merely appears around the text "ABCD", that is, the hollow region of text "ABCD" is surrounded by the dark color. FIG. 3b is also referred together, which is a top view illustrating a first mask 4 of another embodiment of FIG. 1 of the present invention.

Returning to FIG. 1, step S13: printing a firs ink on the first mask, so the first ink is printed on the reflective surface of the reflective layer through the first hollow pattern, in which the first ink has a first color, such as white color. It is worth noting that if the reflective surface is metal material, such as aluminum, whether regardless of the first color, the color displayed by the reflective surface is the reflection color of the metal material, for example, the aluminum material reflects silver-white light.

Step S14: adding a glue layer (for example glue powder or adhesive material) into the first mask. It is worth noting that the glue layer is used for illustration therein and can be applied to subsequent thermal transfer technology to print to the carrier. In this step, the glue layer is an independent layer or a manufacturing process. In another embodiment, the glue layer is directly used as the first ink, so that during the manufacturing of the first ink, the first ink has the properties of the glue layer.

Step 15: peeling off the first ink and the glue layer from the reflective layer, wherein the plurality of beads of the reflective layer is separated from the reflective layer in the area of the first hollow pattern.

Step 16: forming a reflective label, wherein the reflective label is composed of the plurality of beads, the first ink and the glue layer, and has a first hollow pattern.

In another embodiment, after step S16, it can further include the thermal transfer technology that is performed to act on the glue layer, so that the reflective label is adhered to the carrier, in which the carrier is at least one of cotton, linen, wool, silk, rayon, nylon, polyester, acrylic fiber, acetate fiber, triacetate fiber, elastic fiber, glass fiber, metal fiber, rubber fiber and pulp fibers.

In short, the single-color reflective thermal transfer label process begins with providing a reflective layer with the plurality of beads; then, providing the first mask with the plurality of beads on the reflective layer; next, the first ink is printed on the first mask so that the first ink is printed on the reflective surface of the reflective layer through the first hollow pattern; then, adding the glue layer into the first mask; then, peeling off the first ink and the glue layer, so that the plurality of beads of the reflective layer is separated from the reflective layer in the area of the first hollow pattern; and forming the reflective label.

Figure 4:
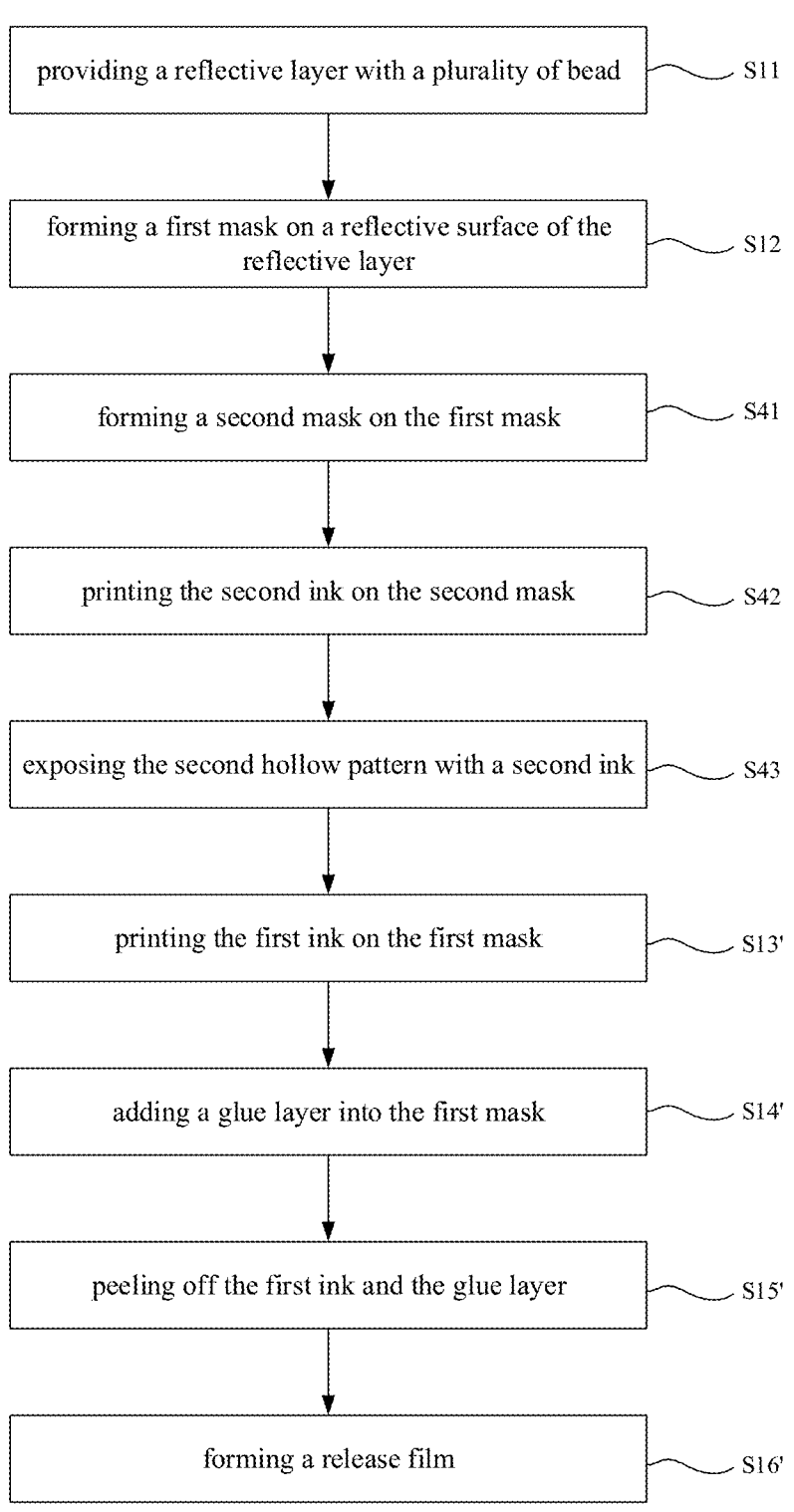
FIG. 4 is a flow chart of the reflective thermal transfer label manufacturing method according to the second embodiment of the present invention.

Referring to FIG. 4, it is a flow chart of a reflective thermal transfer label manufacturing method according to the second embodiment of ( ) the present invention. In FIG. 4, the reflective thermal transfer label manufacturing method is applied to multi-colors reflective thermal transfer label.

The reflective thermal transfer label manufacturing method also begins from step S11, providing a reflective layer with a plurality of beads.

Step S12: forming a first mask on a reflective surface of the reflective layer.

Figure 5A:
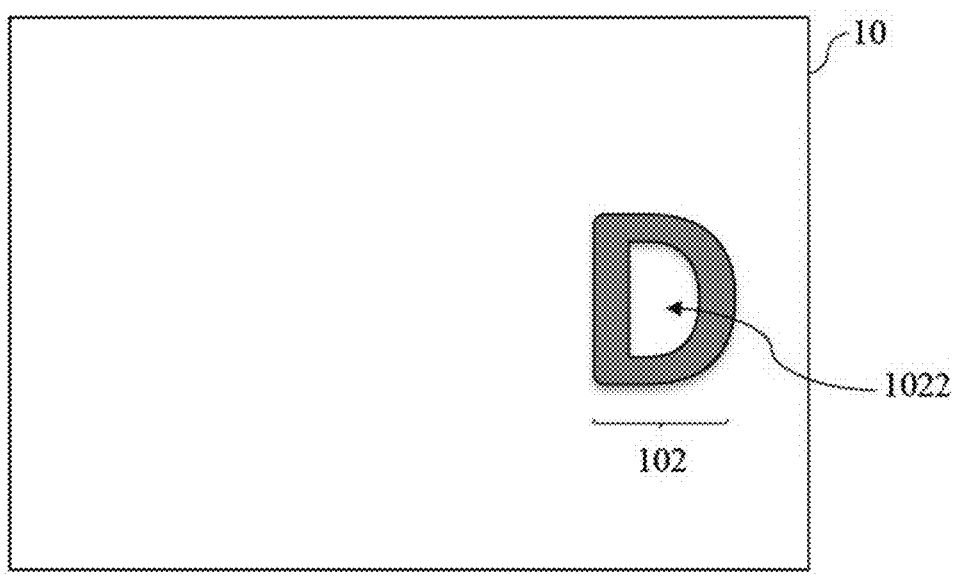
FIG. 5a is a top view illustrating the second mask of FIG. 1 of the present invention.
Figure 5B:
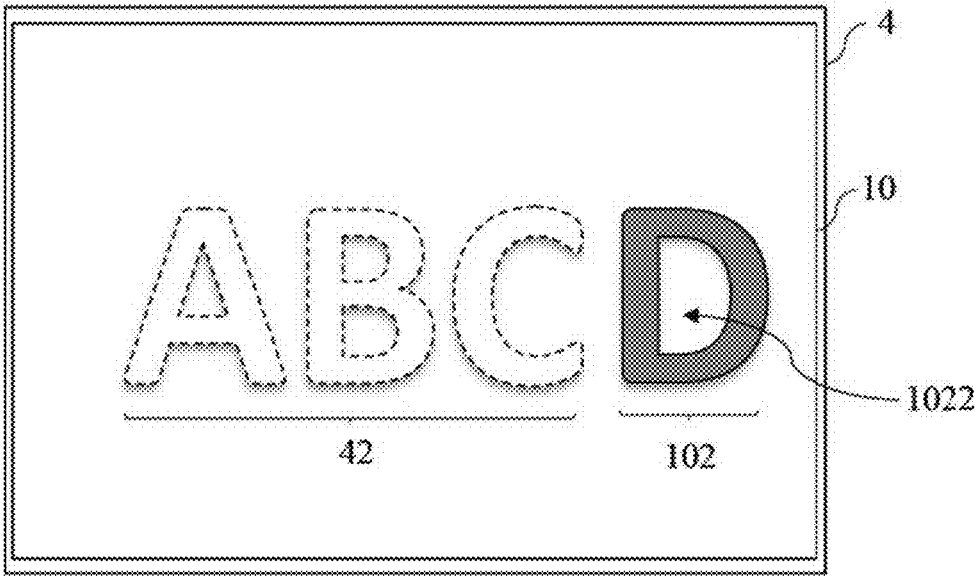
FIG. 5b is a top view illustrating that the second mask of FIG. 1 is formed on the first mask of the present invention.

Step 41: forming a second mask on the first mask, in which the second mask is pre-formed with a second hollow pattern, and the second hollow pattern is a part of the first hollow pattern or the second hollow pattern is independent of the first hollow pattern. FIG. 5a is also referred together herein, which is a top view illustrating the second mask of FIG. 5a of the present invention. In FIG. 5a, the second mask 10 is pre-formed with the second hollow pattern 102. Herein, the text "D" is taken as an example, the colored area 1022 of the text "D" is hollow-shaped. FIG. 5b is also referred together herein, which is a schematic structural diagram illustrating the second mask of FIG. 5a formed on the first mask. In FIG. 5b, the first mask 4 is pre-formed with a first hollow pattern 42, herein, the text "ABC" is used as an example, in which the text "ABC" is hollow shaped, letter "D" is no-hollow shaped, after the second mask 10 is formed on the first mask 4, the letter "D" of the second mask 10 corresponds to the letter "D" of the first mask 4, so that the letter "D" of the second mask 10 reveals the letter "D" of the first mask 4.

Figure 5C:
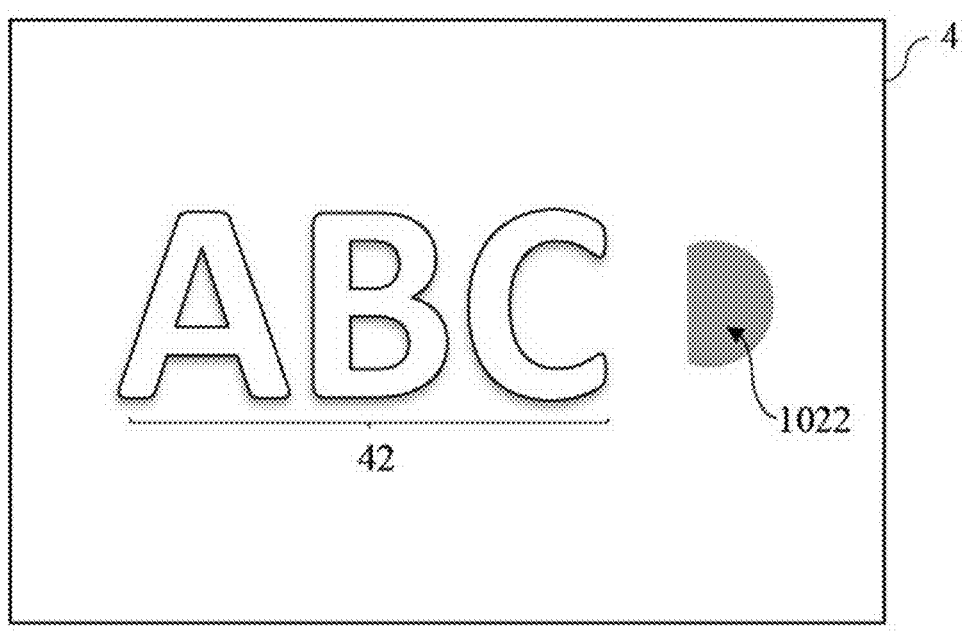
FIG. 5c is a top view illustrating the second ink printing by the first mask of FIG. 1 of the present invention.

Step 42: printing the second ink on the second mask, so that the second ink is printed on the first mask through the second hollow pattern, in which the second ink has a second color, such as red color or other colors. The second color and the first color may be the same or different. Continuing the embodiment of FIG. 5b, the second ink 12 is printed on the colored area 1022 of the letter "D" of the first mask 4 through the second hollow pattern 102, the colored area 1022 of the letter "D" of the first mask 4 has a second color, which can refer to FIG. 5c. FIG. 5c is a top view illustrating the first mask is printed on the second ink of the FIG. 5b of the present invention.

Step 43: exposing the first hollow pattern of the first mask and the second hollow pattern with a second ink.

Step S13': printing the first ink on the first mask so that the first ink is printed on the reflective surface of the reflective layer through the first hollow pattern, and the first ink is also printed on the second ink with the second hollow pattern.

Step S14': adding a glue layer into the first mask so that the glue layer is acted on the first ink through the first hollow pattern of the first mask. In this step, the glue layer is an independent layer or a manufacturing process. In another embodiment, the glue layer is also directly used as the first ink, so that during the manufacturing of the first ink, the first ink also has the properties of the glue layer.

Step S15': when the first ink is separated from the glue layer, in addition to the plurality of beads of the reflective layer is separated from the reflective layer in the area of the first hollow pattern, the second ink is also peeled off from the first mask along with the first ink, in which, the plurality of beads located in the second hollow pattern does not peel off from the reflective layer.

Step 16': the reflective label includes a plurality of beads in the first hollow pattern a but excludes the plurality of beads in the second hollow pattern.

In another embodiment, after step S16' is performed, it may further include thermal transfer technology that is performed to act on the glue layer, so that the reflective label is adhered to the carrier, in which the reflective label has a first color (or the color of the metal material) and a second color. The thermal transfer technology is acted on the glue layer and the carrier, so that the reflective label is adhered to the carrier.

In short, the manufacturing process of the multi-colors reflective thermal transfer begins with providing the reflective layer with a plurality of beads; then, providing the first mask with the first hollow pattern in the reflective layer, so that the second ink is printed on the first mask through the second hollow pattern; then, the first hollow pattern of the first mask and the second hollow pattern with the second ink are exposed; then, the first mask is printed on the first ink, so that the first ink is printed on the reflective surface of the reflective layer through the first hollow pattern, and the first ink covers the second ink with the second hollow pattern; then, adding the glue layer into the first mask, so that the glue layer is acted on the first ink; then, peeling off the first ink and the glue layer, so that the plurality of beads of the reflective layer is separated from the reflective layer in the area of the first hollow pattern and the plurality of beads of the reflective layer in the area of the second hollow pattern is not separated from the reflective layer; and forming the reflective layer on the first hollow pattern and the reflective label is located on the first hollow pattern with the plurality of beads and the second hollow pattern does not include a plurality of beads.

Figure 6A:
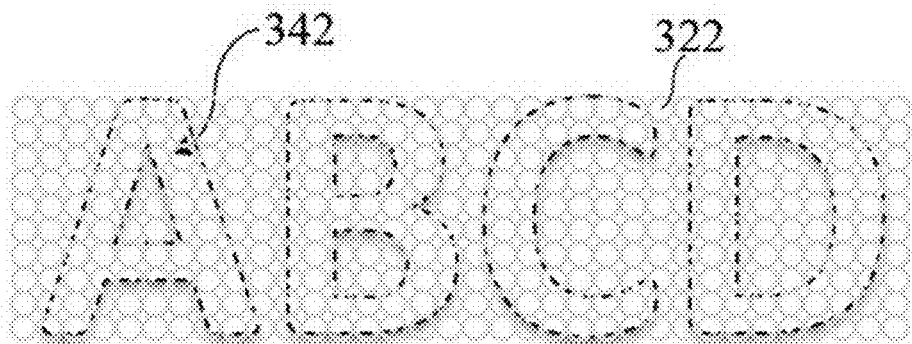
FIG. 6a is a top view illustrating the single-color reflective label of the present invention.
Figure 6B:
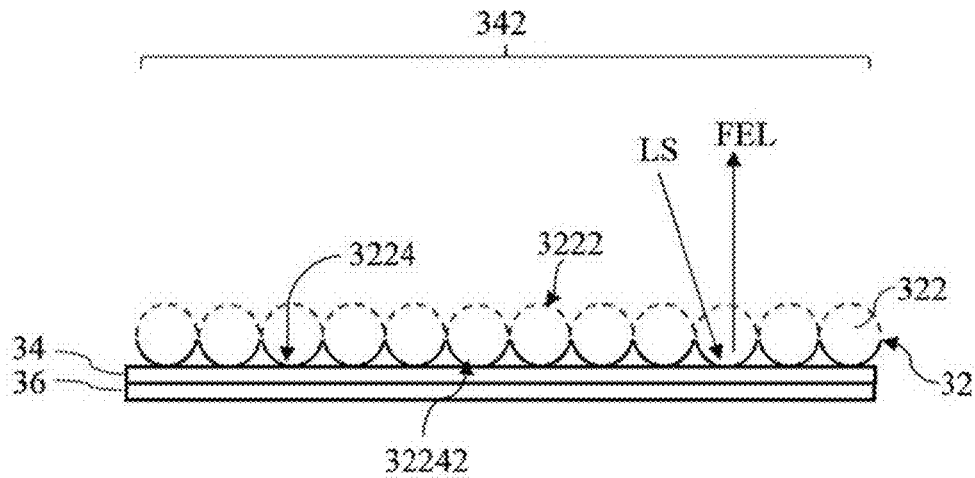
FIG. 6b is a side view illustrating the single-color reflective label of the present invention.

Referring to FIG. 6a and FIG. 6b, which are schematic diagrams of a single-color reflective label according to third embodiment of the present invention, and in FIG. 6b, FIG. 6b is a side view illustrating the single-color reflective label of the present invention.

The single-color reflective label 30 includes a reflective layer 32, a first ink layer 34 and a glue layer 36. The plurality of beads 322 includes a display surface and a reflective surface 3224, in which the plurality of beads 322 is arranged on the reflective layer 32 so that the reflective surface 3224 of the plurality of beads 322 faces the same side and the plurality of beads 322 is partially reflective and optically transparent. Also, the reflective surface 3224 is selectively coated with a metal material 32242, for example, the metal material is aluminum.

The glue layer 36 is stacked on another side of the first ink layer 34 or is fused to the first ink layer 34.

When an external white light LS is incident on the display surface 3222, the white light LS is reflected by the reflective surface 3224 to form a first emitted light FEL of the first hollow pattern 342. When the reflective surface 3224 is transparent, the wavelength of the first emitted light FEL is related to the first color. When the reflective surface 3224 is coated with the metal material, the wavelength of the first emitted light FEL is determined by a characteristic of the metal material, and the wavelength of the first emitted light FEL is not determined by the first color of the first ink layer 24.

Figure 7A:
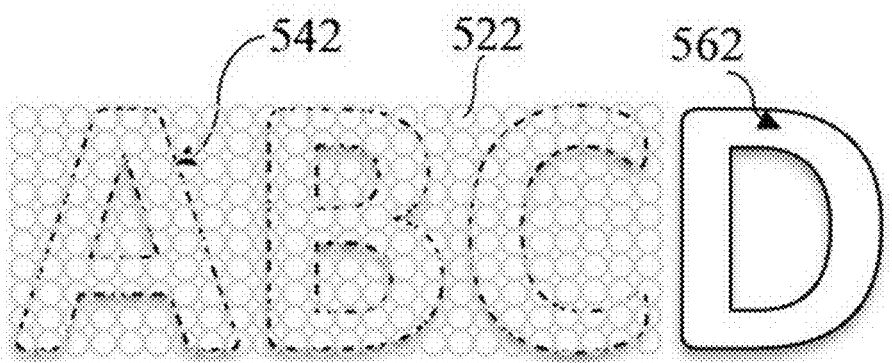
FIG. 7a is a top view illustrating the multi-colors reflective label of the present invention.
Figure 7B:
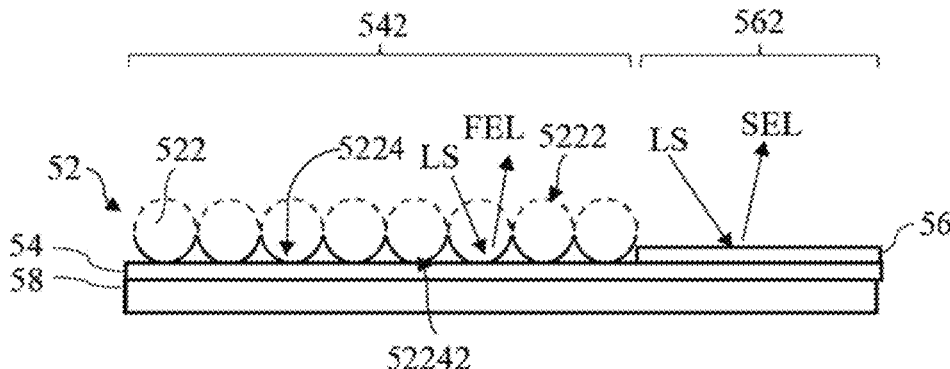
FIG. 7b is a side view illustrating the multi-colors reflective label of the present invention.

Referring to FIG. 7a and FIG. 7b, which are schematic diagrams of a multi-colors reflective label according to the third embodiment of the present invention. In FIG. 7a, which is a top view illustrating the multi-colors reflective label, and in FIG. 7b, which is a side view illustrating the multi-colors reflective label of the present invention.

The multi-colors reflective label 50 includes a reflective layer 52, a first ink layer 54, a second ink layer 56 and a glue layer 58.

The reflective layer 52 includes a plurality of beads 522. The plurality of beads includes a display surface 5222 and a reflective surface 5224, in which the plurality of beads 522 is arranged on the reflective layer 52, so that the reflective surface 5224 of the plurality of beads 522 faces the same side and the plurality of beads is partially reflective and optically transparent, and the reflective surface 5224 is selectively coated with the metal material 52242.

One side of the first ink layer 54 is arranged on the reflective layer 52. The first ink layer 54 is printed on a first release element (same as the first mask mentioned above) (not shown) with a first hollow pattern 542 to form a first hollow pattern 542, in which, the plurality of beads is only formed on the first hollow pattern 542 and is formed on one side of the reflective surface 5224. The first ink layer 52 has a first color, for example white color.

One side of the second ink layer 56 is arranged on the first ink layer 54. The second ink layer 56 is printed on a release element with a second hollow pattern 562 to form a second hollow pattern 562 without the plurality of beads 522. The second ink layer 56 has a second color, for example red color or other colors, and the second ink layer 56 has the second color and the second hollow pattern 562 is a part of the first hollow pattern 542 or the second hollow pattern 562 is independent of the first hollow pattern 542. The material of the second ink layer 56 is same as that of the first ink layer 54 and will not be described again herein.

The glue layer 58 is stacked on another side of the first ink layer 54 or is fused to the first ink layer 54.

When an external white light LS is incident on the display surface 5222, the white light LS is reflected by the reflective surface 5224 to form a first emitted light FEL of the first hollow pattern 542 and the white light LS is reflected by the second ink layer 56 to form a second emitted light SEL of the second hollow pattern 562. When the reflective surface 5224 is partially reflective and optically transparent, the wavelength of the first emitted light FEL is determined by the first color. When the reflective surface 5224 is coated with the metal material, the wavelength of the first emitted light FEL is determined by a characteristic of the metal material, and the wavelength of the second emitted light SEL is determined by the second color.

Although the embodiments of the present invention are disclosed above, they are not intended to limit the present invention. Anyone skilled in the relevant art can modify any shape, structure, and feature described in the claims of the present invention without departing from the spirit and scope of the present invention. Slight changes may be made to the method, method and quantity. Therefore, the scope of patent protection of the present invention must be determined by the scope of the claims attached to this specification.

What is claimed is:

1. A reflective thermal transfer manufacturing method, comprising:

step s1: providing a reflective layer with a plurality of beads, wherein each of the plurality of beads includes a display surface and a reflective surface, and the plurality of beads is arranged on the reflective surface, such that the reflective surface of the plurality of beads faces a same side, and the plurality of beads is partially reflective and optically transparent, and the reflective surface is selectively coated with a metal material;

step s2: forming a first mask on the reflective surface of the reflective layer, wherein the first mask is pre-formed with a first hollow pattern;

step s3: printing a first ink on the first mask, wherein the first ink is printed on the reflective surface of the reflective layer through the first hollow pattern, and the first ink has a first color;

step s4: adding a glue layer into the first ink;

step s5: peeling off the first ink and the glue layer from the reflective layer, wherein the plurality of beads of the reflective layer is separated from the reflective layer in an area of the first hollow pattern; and step s6: forming a reflective label, wherein the reflective label is composed of the plurality of beads, the first ink and the glue, and the reflective label having the first hollow pattern.

2. The reflective thermal transfer manufacturing method according to claim 1, further comprising step s7 of forming a second mask on the first mask between step s2 and step s3, wherein the second mask is pre-formed with a second hollow pattern, and the second hollow pattern is a part of the first hollow pattern or the second hollow pattern is independent of the first hollow pattern.

3. The reflective thermal transfer manufacturing method according to claim 2, further comprising step s8 of printing the second ink on the second mask, such that the second ink is printed on the first mask through the second hollow pattern and does not contact the reflective surface of the plurality of beads, wherein the second ink has a second color and the second color is the same as or different from the first color.

4. The reflective thermal transfer manufacturing method according to claim 3, further comprising step s9 of exposing the first hollow pattern of the first mask and the second hollow pattern of the second ink after step s8.

5. The reflective thermal transfer manufacturing method according to claim 4, wherein after performing step s9, the step s3 further comprising when printing the first hollow pattern with the first ink, the first ink also covers the second ink of the second hollow pattern.

6. The reflective thermal transfer manufacturing method according to claim 5, wherein the step s5 further comprises, when peeling off the first ink and the glue layer, the second ink is also peeled off from the first mask along with the first ink, wherein the plurality of beads located in the second hollow pattern are not peeled off from the reflective layer.

7. The reflective thermal transfer manufacturing method according to claim 6, wherein the reflective label includes the plurality of beads in the first hollow pattern but excludes the plurality of beads in the second hollow pattern.

8. The reflective thermal transfer manufacturing method according to claim 1, wherein thermal transfer technology is performed to act on the glue layer, so that the reflective label is adhered to a carrier.

9. The reflective thermal transfer manufacturing method according to claim 8, wherein the carrier includes at least one of cotton, linen, wool, silk, rayon, nylon, polyester, acrylic fiber, triacetate fiber, elastic fiber, glass fiber, metal fiber, rubber fiber and pulp fiber.

10. A single-color reflective label, comprising:
a reflective layer, the reflective layer having a plurality of beads, wherein the plurality of beads includes a display surface and a reflective surface, and the plurality of beads is arranged on the reflective surface, such that the reflective surface of the plurality of beads faces a same side, and the plurality of beads is partially reflective and optically transparent, and the reflective surface is selectively coated with a metal material;
a first ink layer, wherein one side of the first ink layer is arranged on the reflective layer, the first ink layer is printed on a first release element with a first hollow pattern, wherein the plurality of beads is only arranged on the first hollow pattern and is formed on one side of the reflective surface, the first ink layer has a first color; and
a glue layer, wherein the glue layer is provided for stacking on another side of the first ink layer or fusing to the first ink layer;
wherein when an external white light is incident on the display surface, the white light is reflected by the reflective surface to form a first emitted light of the first hollow pattern, and when the reflective surface is partially reflective and optically transparent, a wavelength of the first emitted light is determined by the first color, and when the reflective surface is coated with the metal material, the wavelength of the first emitted light is determined by a characteristic of the metal material.

11. The single-color reflective label according to claim 10, wherein a material of the first ink layer includes plastisol, solvent, water based, silicon or adhesive and the metal material is aluminum.

12. A multi-color reflective label, comprising:
a reflective layer, the reflective layer having a plurality of beads, wherein the plurality of beads includes a display surface and a reflective surface, wherein the plurality of beads is arranged on the reflective layer, such that the reflective surface of the plurality of beads faces a same side and the plurality of beads is partially reflective and optically transparent, and the reflective surface is selectively coated with a metal material;
a first ink layer, wherein one side of the first ink layer is arranged on the reflective layer, the first ink layer is printed on a first release element with a first hollow pattern to form a first hollow pattern with the plurality of beads, wherein the plurality of beads only arranged on the first hollow pattern and is formed on one side of the reflective surface, and the first ink layer has a first color;
a second ink layer, wherein the second ink layer is arranged on one side of the first ink layer, the second ink layer is printed on a second release element with a second hollow pattern to form the second hollow pattern without the plurality of beads, wherein the second ink layer has a second color and the second hollow pattern is a part of the first hollow pattern or the second hollow pattern is independent of the first hollow pattern; and
a glue layer, wherein the glue layer is provided for stacking on another side of the first ink layer or fusing to the first ink layer;
wherein when an external white light is incident on the display surface, the white light is reflected by the reflective surface to form a first emitted light of the first hollow pattern and the white light is reflected by the second ink layer to form a second emitted light of the second hollow pattern, and when the reflective surface is partially reflective and optically transparent, a wavelength of the first emitted light is determined by the first color, and when the reflective surface is coated with the metal material, a wavelength of the first emitted light is determined by the second color.

13. The multi-color reflective label according to claim 12, wherein the first ink and the second ink includes plastisol, solvent, water based, silicon or adhesive and the metal material is aluminum.

* * * * *